United States Patent [19]

Keogh

[11] 4,394,471
[45] * Jul. 19, 1983

[54] COMPOSITIONS OF ALKYLENE-ALKYL ACRYLATE COPOLYMERS HAVING IMPROVED FLAME RETARDANT PROPERTIES

[75] Inventor: Michael J. Keogh, Bridgewater, N.J.

[73] Assignee: Union Carbide Corporation, Danbury, Conn.

[*] Notice: The portion of the term of this patent subsequent to Jan. 6, 1998, has been disclaimed.

[21] Appl. No.: 232,480

[22] Filed: Feb. 11, 1981

Related U.S. Application Data

[63] Continuation-in-part of Ser. No. 127,509, Mar. 5, 1980, abandoned, which is a continuation-in-part of Ser. No. 944,336, Sep. 21, 1978, Pat. No. 4,243,579.

[51] Int. Cl.³ .................... C08K 5/34; C08K 3/26; C08K 3/22; C08K 3/30
[52] U.S. Cl. ................ 524/92; 174/110 SR; 524/423; 524/424; 524/425; 524/426
[58] Field of Search ............ 260/45.7 S, 45.7 RL, 260/42.15, 42.14; 174/110 SR; 524/92, 423, 424, 425, 436

[56] References Cited

U.S. PATENT DOCUMENTS

| | | | |
|---|---|---|---|
| 3,030,327 | 4/1962 | Hosch | 260/30.6 |
| 3,326,833 | 6/1967 | Raley et al. | 260/28.5 |
| 3,350,372 | 10/1967 | Anspon et al. | 260/86.7 |
| 3,382,209 | 5/1968 | Deichert | 260/45.75 |
| 3,772,232 | 11/1973 | Hayes | 260/28.5 AV |
| 3,816,367 | 6/1974 | Larkin et al. | 260/29.6 R |
| 3,832,326 | 8/1974 | North et al. | 260/42.29 |
| 3,862,070 | 1/1975 | Fukushima et al. | 266/28.5 A |
| 3,865,782 | 2/1975 | Anderson | 260/45.9 R |
| 3,873,567 | 3/1975 | Cyba | 260/326 C |
| 3,897,346 | 7/1975 | Vogel | 252/8.1 |
| 3,953,565 | 4/1976 | Mizutani et al. | 264/210 F |
| 4,012,343 | 3/1977 | Raley | 260/2.5 EP |
| 4,067,847 | 1/1978 | Yui et al. | 260/45.7 R |
| 4,122,062 | 10/1978 | Monte | 260/42.14 |
| 4,126,593 | 11/1978 | Takahashi | 260/23 R |
| 4,162,245 | 7/1979 | Collins et al. | 260/40 R |
| 4,243,579 | 1/1981 | Keogh | 524/411 |
| 4,291,136 | 9/1981 | Keogh | 525/102 |
| 4,353,997 | 10/1982 | Keogh | 524/81 |

Primary Examiner—Veronica P. Hoke
Attorney, Agent, or Firm—James C. Arvantes; Robert C. Brown

[57] ABSTRACT

The disclosure of this application is directed to compositions having improved flame retardant properties containing an alkylene-alkyl acrylate copolymer, a halogenated flame retardant additive and an oxide, carbonate, hydroxide or sulfate of magnesium or calcium in an amount more than 20 and up to about 30 percent by weight. The compositions disclosed are useful as jacketing material and as insulation about wire and cable.

22 Claims, No Drawings

COMPOSITIONS OF ALKYLENE-ALKYL ACRYLATE COPOLYMERS HAVING IMPROVED FLAME RETARDANT PROPERTIES

This application is a continuation-in-part of my co-pending application Ser. No. 127,509 filed Mar. 5, 1980 now abandoned which in turn is a continuation-in-part of application Ser. No. 944,336 filed Sept. 21, 1978, now U.S. Pat. No. 4,243,579.

SUMMARY OF THE INVENTION

This invention relates to compositions, having improved flame retardant properties and reduced gas evolution on burning, which contain an alkylene-alkyl acrylate copolymer, a halogenated flame retardant additive and an oxide, carbonate, hydroxide or sulfate of magnesium or calcium in an amount of more than 20 and up to about 30 percent by weight. The compositions of the present invention are particularly useful as jacketing material about industrial control cables and telephone wires and cables and as insulation about electrical conductors.

BACKGROUND OF THE INVENTION

Compositions based on olefin polymers, such as copolymers of an alkylene-alkyl acrylate, by reason of their advantageous physical and electrical properties, have been suggested for use in various commercial applications. For example, alkylene-alkyl acrylate copolymers are corrosion resistant, tough and abrasion resistant. Consequently, alkylene-alkyl acrylate copolymers have been suggested for use in compositions to be used as jacketing material about industrial control cables and telephone wires and cables and as insulation about electrical conductors.

Although alkylene-alkyl acrylate copolymers have properties which make them desirable for use in compositions which are to be used as jacketing material and as insulation, as described, alkylene-alkyl acrylate copolymers suffer the disadvantage of being flammable. In order to render these copolymers flame retardant and also, in order to reduce gas evolution on burning, a halogenated flame retardant additive and an alkaline earth metal salt or base have been added thereto, as described in my applications which have been previously identified. Compositions, disclosed in these applications, the disclosures of which applications are incorporated herein by reference, are commercially attractive systems which are flame retardant, and upon burning, do not produce dense smoke and do not evolve high levels of acidic and corrosive gases.

Currently, in light of more stringent industry standards and more stringent government regulations, there is an immediate need for compositions which are characterized by a higher degree of flame retardancy with no unacceptable degradation of other desirable properties previously described.

DESCRIPTION OF THE INVENTION

The present invention provides compositions which meet the need of improved flame retardancy while maintaining acceptable standards with respect to other desirable properties.

Compositions of the present invention, useful for the applications described, comprise a normally solid alkylene-alkyl acrylate copolymer, from about one to about 30 percent by weight and preferably about 5 to about 20 percent by weight of a halogenated flame retardant additive, and more than 20 and up to about 30 percent by weight of an oxide, carbonate, hydroxide or sulfate of magnesium or calcium. Percent by weight, unless otherwise stated, is based on the total weight of the composition.

The alkylene-alkyl acrylate copolymers of the present invention are known products produced by reacting an alkene with an alkyl acrylate and usually contain about 2 to about 50 percent by weight combined alkyl acrylate.

Suitable alkenes are ethylene, propylene, butene-1, isobutylene, pentene-1, 2-methylbutene-1, 3-methylbutene-1, hexene-1, heptene-1, octene-1 and the like.

The alkylene moiety of the alkylene-alkyl acrylate copolymers contain from 2 to 18 carbon atoms inclusive, preferably 2 to 3 carbon atoms inclusive.

Suitable alkyl acrylate monomers which are copolymerized with the alkenes fall within the scope of the following formula:

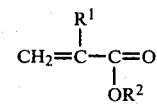

wherein $R^1$ is hydrogen or methyl and $R^2$ is alkyl having one to 8 carbon atoms inclusive. Illustrative compounds encompassed by this formula are: methyl acrylate, ethyl acrylate, methyl methacrylate, n-butyl acrylate, t-butyl acrylate, n-butyl methacrylate, 2-ethylhexyl acrylate and the like.

Alkylene-alkyl acrylate copolymers generally have a density (ASTMD 1505) with a conditioning as in ASTMD 147-72 of about 0.92 to about 0.94 and a melt index (ASTMD-1237 at 44 psi tested pressure) of about 0.5 to about 500 decigrams per minute.

For purposes of the present invention, the preferred copolymer is ethylene-ethyl acrylate, generally having about three to about 40 percent by weight combined ethyl acrylate, preferably having about 5 to about 20 percent by weight combined ethyl acrylate. Combined alkyl acrylate is conveniently determined by infrared analysis.

Halogenated flame retardant additives, useful for purposes of the present invention, are well known to those skilled in the art. These flame retardant additives are halogenated (brominated or chlorinated) organic compounds. The preferred halogenated organic compounds include chlorinated polyethylene, polyvinyl chloride, polyvinylidene chloride, polyvinyl chloride copolymers, halogenated paraffin and paraffin waxes, chlorinated alicyclic hydrocarbons, and brominated aromatic compounds. The most preferred include decabromodiphenyl oxide and compounds of the following formulae:

-continued

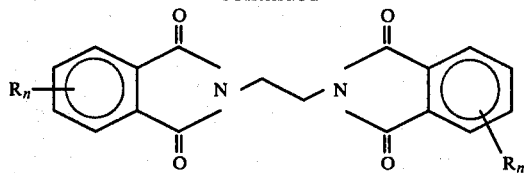

wherein R is independently chlorine or bromine and n is an integer from 1 to 6, such as ethylene(bis-tetrabromophthalimide).

The calcium or magnesium oxides, carbonates, hydroxides, or sulfates of the present invention are commercially available in different forms and grades.

The calcium or magnesium oxides, carbonates, hydroxides, or sulfates may be optionally coated with any compatible hydrophobic material. The preferred coating materials are metal salts of fatty acids, organo silanes and organo titanates.

Exemplary metals of the metal component of the salts of the fatty acids fall in Groups Ia, IIa or IIb of the Periodic Table (Handbook of Chemistry and Physics—50th Edition). Acids used to form the metal salts are saturated or unsaturated monobasic or dibasic, branched or straight chain fatty acids of 8–20 carbon atoms. Such acids that may be included within the practice of this invention, but not limited thereto, are palmitic, stearic, lauric, oleic, sebacic, ricinoleic, palmitoleic and the like. The preferred acid is stearic acid while the preferred metal salts are calcium stearate and zinc stearate.

The organo silanes are preferably alkoxy silanes such as alkyl alkoxy silane, alkenyl alkoxy silane, alkynyl alkoxy silane, alkyl aryl alkoxy silane, alkenyl aryl alkoxy silane and alkynyl aryl alkoxy silane. Suitable alkoxy silanes include, for example, methyltriethoxy silane, methyl-tris-(2-methoxy-ethoxy) silane, dimethyldiethoxy silane, allyltrimethoxy silane and the like. Also suitable are the vinyl silanes such as vinyl-tris-(2-methoxyethoxy) silane, vinyl trimethoxy silane, vinyl triethoxy silane and the like. If desired, the organo silane, per se, can be included in the composition as an additive.

Illustrative suitable organo titanates fall within the scope of the following formula:

$$Ti(OR^3)_4$$

wherein $R^3$ is a hydrocarbon radical. Exemplary of organo titanates are tetrabutyl titanate, tetraisopropyl titanate and the like.

The alkaline earth metal compounds can be coated by admixing about 0.05 to about 5 parts by weight of hydrophobic material per 100 parts by weight of alkaline earth metal salt or base in a two-roll mill, Henschel mixer, Waring blender and the like.

The compositions of the present invention can contain other additives, as is well known in the art, depending upon the ultimate use of the composition.

For example, the compositions can contain peroxides, to cure the compositions to crosslinked products, generally on the order of about 0.05 to about 4.0 percent by weight; antioxidants generally on the order of about 0.01 to about 3.0 percent by weight; carbon blacks as well as other additives commonly used in moldable compositions, curable compositions, compositions to be extruded into film material, compositions to be used as coatings and the like.

When the compositions of the present invention are to be used in wire and cable or molding applications, it is advantageous that the compositions contain a filler. A preferred filler is talc, especially talc coated with a metal salt of a fatty acid, previously described. Another preferred filler is clay, especially clay which is calcined.

The compositions of the present invention are conveniently prepared by blending or compounding the components thereof in a suitable apparatus. The alkylene-alkyl acrylate copolymer and the other described components may be blended together by any of the techniques used in the art to blend and compound thermoplastics to homogeneous masses. Prior to or during the blending of the components together, the calcium or magnesium oxide, carbonate, hydroxide or sulfate may be coated by known techniques. As regards blending, the components may be fluxed on a variety of apparatus including multi-roll mills, screw mills, continuous mixers, extruders and Banbury mixers.

When all the solid components of the compositions are available in the form of a powder, or as small particles, the compositions are most conveniently prepared by first making a blend of the components, for instance, in a Banbury mixer or a continuous extruder, and then masticating this blend on a heated mill, for instance, a two-roll mill, and the milling continued until an ultimate mixture of the components is obtained.

In those instances wherein the copolymer is not available in powder form, the compositions may be prepared by introducing the copolymer in a two-roll mill, masticating it until it forms a band around roll, after which a blend of the remaining components is added and the milling continued until an ultimate mixture is obtained. The rolls are preferably maintained at a temperature which is within the range of 80° C. to 135° C. and which is below the decomposition temperatures of the peroxide compounds if such are used. The composition, in the form of a sheet, is removed from the mill and then brought into a form, typically dice-like pieces, suitable for subsequent processing.

The compositions may then be extruded onto a wire or cable, or other substrate. If the compositions of the present invention are chemically curable, they are extruded onto wire or cable, or other substrate and vulcanized at elevated temperatures of about >180° C. and preferably at >200°–230° C. using conventional vulcanizing procedures.

The following examples are illustrative of the present invention and are not intended to limit the scope thereof in any manner.

EXAMPLE 1

Composition, the formulation of which is set forth below, was prepared by mixing the components thereof in a Brabender Plasticord mixer preheated to a temperature of 120° C. The composition was mixed to homogeniety at a temperature below 135° C.

|  | Percent By Weight |
|---|---|
| Ethylene-ethyl acrylate copolymer having a melt index of 1.2 and combined ethyl acrylate content of 15–17 percent by weight. | 57.0 |
| Calcium carbonate. | 25.7 |
| Flame retardant. | 15 |
| 1,2-dihydro-2,3,4-trimethylquinoline | |

| | Percent By Weight |
|---|---|
| (antioxidant). | 0.7 |
| Di-α-cumyl peroxide | 1.6 |
| Limiting oxygen index (ASTMD 2863-70) | 26.8 |

The flame retardant used contained 67 percent by weight bromine and has the formula:

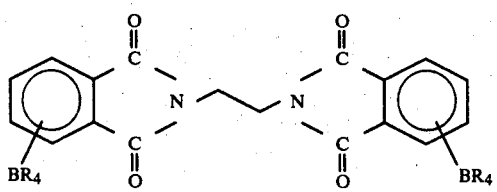

Ethylene(bis-tetrabromophthalimide)

Limiting oxygen index is a standard test used to quantitatively measure the degree of flammability. The value of 26.8 indicates that the composition of Example 1 is suitable to be used as jacketing about industrial control cables and telephone wires and cables and as insulation about electrical conductors such as copper wires.

In order to further illustrate the advantageous properties of the compositions of the present invention, compositions were prepared as described in Example 1 and tested for percent ash, percent halogen retained in the ash and percent smoke evolved.

Percent ash value, which is a measure of retained ash, is important for several reasons. Retained ash serves as heat and electrical insulation, aiding in maintaining the integrity of the product, on burning in a fire incident. Also, retained ash aids in reducing dripping from the burning product.

A higher percent halogen content in the ash means that less halogen has been released to the atmosphere. A composition which releases less halogen, measured as halogen acid, is less toxic to humans and less corrosive to equipment.

Percent by weight halogen content of ash-determined by the procedure described in Quantitative Organic Microanalysis, A. Steyermark, Academic Press, New York and London, 1961, pages 316–339.

Percent by weight smoke evolved-determined by the procedure described in Journal of Fire and Flammability, Volume 9, October 1978, pages 459–466.

Percent by weight ash-determined by the procedure described in Plastics Technology, March 1976, pages 46–49.

Tests noted herein were conducted using plaques prepared from samples of the compositions. Plaques having dimensions of 3 inches by 8 inches by 0.125 inch, were prepared in a press under the following conditions: Pressure—5000 psi, Temperature—180° C., Time Cycle—15 minutes.

TABLE 1

| Formulation: | Example 2 | PERCENT BY WEIGHT Control 1 | Control 2 |
|---|---|---|---|
| Copolymer of ethylene-ethyl acrylate containing 15 percent by weight combined ethyl acrylate - melt index 1.6 | 56.0 | 56.0 | 56.0 |
| Talc coated with zinc stearate | 0.6 | 10.6 | 5.6 |
| Calcium carbonate coated with calcium stearate | 25 | 15.0 | 20 |
| Ethylene (Bis-tetrabromophthalimide) (flame retardant additive) | 16.0 | 16.0 | 16.0 |
| 1,2-Dihydro-2,3,4-trimethyl quinoline (antioxidant) | 0.6 | 0.6 | 0.6 |
| Vinyl-tris(2-methoxyethoxy) silane | 0.2 | 0.2 | 0.2 |
| Di-α-cumyl peroxide | 1.6 | 1.6 | 1.6 |
| Limiting Oxygen Index | 25.6 | 24.8 | 25.2 |
| Percent by weight ash | 42 | 26.1 | 28.1 |
| Percent by weight halogen in ash | 67.8 | 42.0 | 49.6 |
| Percent by weight smoke evolved | 3.93 | 6.19 | 5.08 |

Comparable results are achieved on varying the amounts of the specified salts and bases of calcium and magnesium within the range of greater than 20 to about 30 percent by weight.

What is claimed is:

1. A flame retardant alkylene-alkyl acrylate copolymer composition comprising an alkylene-alkyl acrylate copolymer, from about 1 to 30 weight percent of a halogenated flame retardant additive, and more than 20, up to about 30 weight percent of at least one of calcium or magnesium oxide, carbonate, hydroxide or sulfate; said weight percents based on the total weight of the composition.

2. A composition as defined in claim 1 wherein the alkylene-alkyl acrylate copolymer is ethylene-ethyl acrylate copolymer.

3. A composition as defined in claim 1 which contains magnesium or calcium carbonate.

4. A composition as defined in claim 1 which contains magnesium or calcium oxide.

5. A composition as defined in claim 1 which contains magnesium or calcium hydroxide.

6. A composition as defined in claim 1 which contains magnesium or calcium sulfate.

7. A composition as defined in claim 1 which contains an antioxidant.

8. A composition as defined in claim 1 which contains a peroxide.

9. A composition as defined in claim 8 wherein the peroxide is di-α-cumyl peroxide.

10. A composition as defined in claim 1 wherein the flame retardant additive is ethylene(bis-tetrabromophthalimide).

11. A composition as defined in claim 1 wherein the halogenated flame retardant additive is present in an amount of about 5 to about 20 percent by weight.

12. An electrical conductor insulated with the composition or crosslinked composition of claim 1.

13. A wire or cable jacketed with the composition or crosslinked composition of claim 1.

14. The crosslinked product of the composition defined in claim 1.

15. A composition as defined in claim 1 wherein said composition contains an additional filler.

16. A composition as defined in claim 15 wherein the additional filler is talc.

17. A composition as defined in claim 15 wherein the additional filler is clay.

18. A composition as defined in claim 15 wherein the additional filler is carbon black.

19. A composition as defined in claim 1 which contains an antioxidant, additional filler, and an organo silane.

20. A composition as defined in claim 1 which contains an antioxidant, additional filler and an organo titanate.

21. A composition as defined in claim 1 wherein said magnesium or calcium compound is present in an amount of about 25 percent by weight.

22. A flame retardant composition comprising an ethylene-ethyl acrylate copolymer, from about 1 to 30 percent by weight of the halogenated flame retardant additive, ethylene bis(tetrabromophthalimide) and more than 20, up to about 30 weight percent of at least one of calcium or magnesium oxide, carbonate, hydroxide or sulfate, said weight percents based on the total weight of the composition.

* * * * *